(12) United States Patent
Bouchard

(10) Patent No.: US 8,630,011 B2
(45) Date of Patent: Jan. 14, 2014

(54) METHOD AND SYSTEM FOR SECURE FACSIMILE DELIVERY AND REGISTRATION

(75) Inventor: Thaddeus Bouchard, Andover, MA (US)

(73) Assignee: Omtool, Ltd., Andover, MA (US)

( * ) Notice: Subject to any disclaimer, the term of this patent is extended or adjusted under 35 U.S.C. 154(b) by 0 days.

(21) Appl. No.: 13/442,185

(22) Filed: Apr. 9, 2012

(65) Prior Publication Data

US 2012/0194877 A1    Aug. 2, 2012

Related U.S. Application Data

(60) Continuation of application No. 11/538,628, filed on Oct. 4, 2006, now Pat. No. 8,184,316, which is a division of application No. 10/365,674, filed on Feb. 11, 2003, now abandoned.

(51) Int. Cl.
*G06F 3/12*  (2006.01)
*G06K 15/00*  (2006.01)
*H04N 1/40*  (2006.01)

(52) U.S. Cl.
USPC .................. 358/1.15; 358/1.16; 358/444

(58) Field of Classification Search
USPC ............ 358/1.15, 1.16, 400, 402, 405, 434, 358/439, 444, 468, 470; 379/100.01
See application file for complete search history.

(56) References Cited

U.S. PATENT DOCUMENTS

| | | | |
|---|---|---|---|
| 4,392,021 A | 7/1983 | Slate | |
| 4,958,235 A | 9/1990 | Sims et al. | |
| 4,974,254 A | 11/1990 | Perine et al. | |
| 4,985,919 A | 1/1991 | Naruse et al. | |
| 4,994,926 A | 2/1991 | Gordon et al. | |
| 5,155,601 A | 10/1992 | Toyama | |
| 5,166,977 A | 11/1992 | Ross | |
| 5,168,376 A | 12/1992 | Motohama | |
| 5,202,920 A | 4/1993 | Takahashi | |

(Continued)

FOREIGN PATENT DOCUMENTS

| | | |
|---|---|---|
| CA | 1329852 C | 5/1994 |
| CA | 2189211 A1 | 3/1998 |
| EP | 1234253 A1 | 8/2007 |
| WO | WO-9914979 A1 | 3/1999 |
| WO | WO-9934304 A1 | 7/1999 |
| WO | WO-0135273 A1 | 5/2001 |
| WO | WO-0152485 A1 | 7/2001 |
| WO | WO-03036515 A1 | 5/2003 |

OTHER PUBLICATIONS

International Search Report for PCT/US02/34673 (3 pgs.).

(Continued)

*Primary Examiner* — Madelein A Nguyen
(74) *Attorney, Agent, or Firm* — Choate Hall & Stewart LLP; William R. Haulbrook

(57) ABSTRACT

A secure fax transmission system can be used to assure the intended recipient of a confidential document being sent via facsimile is the only person that will have access to the document once it is sent. An application module communicates with a client user interface over a first network and communicates with a recipient fax machine over a second network. The application module receives information associated with a confidential document being sent via facsimile. Prior to sending the document, the application module determines if the recipient fax number has been previously registered as a secure fax number. The application module then sends the document to the recipient if the recipient fax number is registered a secure. If the recipient fax number is not registered as secure, the application module sends a request for registration to the recipient fax number.

19 Claims, 7 Drawing Sheets

(56) References Cited

U.S. PATENT DOCUMENTS

| | | | |
|---|---|---|---|
| 5,255,106 A | 10/1993 | Castro | |
| 5,291,302 A | 3/1994 | Gordon et al. | |
| 5,339,174 A | 8/1994 | Harris | |
| 5,339,361 A | 8/1994 | Schwalm et al. | |
| 5,404,231 A | 4/1995 | Bloomfield | |
| 5,417,488 A | 5/1995 | Horton | |
| 5,452,099 A | 9/1995 | Von Meister | |
| 5,459,584 A | 10/1995 | Gordon et al. | |
| 5,465,300 A | 11/1995 | Altschuler et al. | |
| 5,530,755 A | 6/1996 | Pailles et al. | |
| 5,535,277 A | 7/1996 | Shibata et al. | |
| 5,539,530 A | 7/1996 | Reifman et al. | |
| 5,552,897 A | 9/1996 | Mandelbaum et al. | |
| 5,553,145 A | 9/1996 | Micali | |
| 5,555,307 A | 9/1996 | Le Corre et al. | |
| 5,587,809 A | 12/1996 | Le Corre et al. | |
| 5,590,196 A | 12/1996 | Moreau | |
| 5,615,269 A | 3/1997 | Micali | |
| 5,621,539 A | 4/1997 | Brown et al. | |
| 5,629,982 A | 5/1997 | Micali | |
| 5,666,420 A | 9/1997 | Micali | |
| 5,671,285 A * | 9/1997 | Newman | 705/78 |
| 5,673,316 A | 9/1997 | Auerbach et al. | |
| 5,771,101 A | 6/1998 | Bramall | |
| 5,790,665 A | 8/1998 | Micali | |
| 5,805,719 A * | 9/1998 | Pare et al. | 382/115 |
| 5,812,670 A | 9/1998 | Micali | |
| 5,835,726 A | 11/1998 | Shwed et al. | |
| 5,859,967 A | 1/1999 | Kaufeld et al. | |
| 5,903,721 A | 5/1999 | Sixtus | |
| 5,909,289 A | 6/1999 | Shibata et al. | |
| 5,982,505 A | 11/1999 | Jeon | |
| 6,011,847 A | 1/2000 | Follendore, III | |
| 6,014,228 A | 1/2000 | Castro | |
| 6,014,631 A | 1/2000 | Teagarden et al. | |
| 6,023,345 A | 2/2000 | Bloomfield | |
| 6,073,118 A | 6/2000 | Gormish et al. | |
| 6,134,326 A | 10/2000 | Micali | |
| 6,137,884 A | 10/2000 | Micali | |
| 6,141,750 A | 10/2000 | Micali | |
| 6,148,301 A | 11/2000 | Rosenthal | |
| 6,157,706 A | 12/2000 | Rachelson | |
| 6,161,181 A | 12/2000 | Haynes, III et al. | |
| 6,182,118 B1 | 1/2001 | Finney et al. | |
| 6,192,165 B1 | 2/2001 | Irons | |
| 6,192,407 B1 | 2/2001 | Smith et al. | |
| 6,266,159 B1 | 7/2001 | Otsuka et al. | |
| 6,427,032 B1 | 7/2002 | Irons et al. | |
| 6,430,691 B1 | 8/2002 | Di Santo et al. | |
| 6,470,086 B1 | 10/2002 | Smith | |
| 6,487,599 B1 | 11/2002 | Smith et al. | |
| 6,570,667 B1 | 5/2003 | Hattori et al. | |
| 6,594,032 B1 * | 7/2003 | Hiroki et al. | 358/1.15 |
| 6,609,196 B1 | 8/2003 | Dickinson, III et al. | |
| 6,625,642 B1 | 9/2003 | Naylor et al. | |
| 6,670,537 B2 | 12/2003 | Hughes et al. | |
| 6,744,761 B1 | 6/2004 | Neumann et al. | |
| 6,744,936 B2 | 6/2004 | Irons et al. | |
| 6,760,752 B1 | 7/2004 | Liu et al. | |
| 6,867,876 B1 | 3/2005 | Czyszczewski et al. | |
| 6,952,281 B1 | 10/2005 | Irons et al. | |
| 6,977,740 B1 | 12/2005 | Mandalia | |
| 7,050,188 B1 | 5/2006 | Yajima et al. | |
| 7,080,409 B2 | 7/2006 | Eigeles | |
| 7,082,538 B2 | 7/2006 | Bouchard et al. | |
| 7,116,433 B1 | 10/2006 | Toyoda | |
| 7,151,834 B1 | 12/2006 | Cannon et al. | |
| 7,168,036 B2 | 1/2007 | Klotz, Jr. et al. | |
| 7,283,270 B2 | 10/2007 | Boire-Lavigne et al. | |
| 7,463,377 B2 | 12/2008 | Aoki | |
| 7,596,691 B2 | 9/2009 | Koue et al. | |
| 7,631,193 B1 | 12/2009 | Hoffman | |
| 8,045,203 B2 | 10/2011 | Henry et al. | |
| 2002/0002675 A1 | 1/2002 | Bush | |
| 2002/0007453 A1 | 1/2002 | Nemovicher | |
| 2002/0049618 A1 | 4/2002 | McClure et al. | |
| 2002/0054334 A1 | 5/2002 | Harrison et al. | |
| 2002/0055909 A1 | 5/2002 | Fung et al. | |
| 2002/0078052 A1 | 6/2002 | Cheng | |
| 2002/0087861 A1 * | 7/2002 | Segev et al. | 713/168 |
| 2002/0091928 A1 | 7/2002 | Bouchard et al. | |
| 2002/0093674 A1 | 7/2002 | Ferlitsch et al. | |
| 2002/0099938 A1 | 7/2002 | Spitz | |
| 2002/0138547 A1 | 9/2002 | Cherry et al. | |
| 2002/0157028 A1 | 10/2002 | Koue et al. | |
| 2003/0031341 A1 | 2/2003 | Rhoads | |
| 2003/0043403 A1 | 3/2003 | Tashima | |
| 2003/0046363 A1 | 3/2003 | Ezato | |
| 2003/0058478 A1 | 3/2003 | Aoki | |
| 2003/0065623 A1 | 4/2003 | Corneil et al. | |
| 2003/0070074 A1 * | 4/2003 | Geller et al. | 713/168 |
| 2003/0086124 A1 | 5/2003 | Parry | |
| 2003/0095289 A1 | 5/2003 | Mitani | |
| 2003/0099336 A1 | 5/2003 | Speeney et al. | |
| 2003/0105725 A1 | 6/2003 | Hoffman | |
| 2003/0115448 A1 * | 6/2003 | Bouchard | 713/153 |
| 2003/0120729 A1 | 6/2003 | Kim et al. | |
| 2003/0163431 A1 | 8/2003 | Ginter et al. | |
| 2003/0163529 A1 | 8/2003 | Yamaguchi | |
| 2003/0163552 A1 | 8/2003 | Savitzky et al. | |
| 2003/0164986 A1 | 9/2003 | Boire-Lavigne et al. | |
| 2003/0217034 A1 | 11/2003 | Shutt | |
| 2004/0015779 A1 | 1/2004 | Shorter | |
| 2004/0023656 A1 * | 2/2004 | Purdy et al. | 455/445 |
| 2004/0042034 A1 | 3/2004 | Tiffan et al. | |
| 2004/0073613 A1 | 4/2004 | Plewnia | |
| 2004/0111375 A1 | 6/2004 | Johnson | |
| 2004/0111644 A1 * | 6/2004 | Saunders et al. | 713/202 |
| 2004/0125396 A1 | 7/2004 | Burke | |
| 2004/0158733 A1 | 8/2004 | Bouchard | |
| 2004/0184092 A1 | 9/2004 | Ogawa | |
| 2004/0205137 A1 | 10/2004 | Chen et al. | |
| 2004/0205616 A1 | 10/2004 | Rosenberg et al. | |
| 2004/0230807 A1 | 11/2004 | Baird et al. | |
| 2004/0267876 A1 * | 12/2004 | Kakivaya et al. | 709/200 |
| 2005/0055337 A1 | 3/2005 | Bebo et al. | |
| 2005/0097046 A1 | 5/2005 | Singfield | |
| 2005/0097171 A1 | 5/2005 | Hikichi | |
| 2005/0102354 A1 | 5/2005 | Hollenbeck et al. | |
| 2005/0125319 A1 | 6/2005 | Johnson | |
| 2005/0131815 A1 | 6/2005 | Fung et al. | |
| 2005/0182656 A1 | 8/2005 | Morey | |
| 2005/0195447 A1 | 9/2005 | Os | |
| 2005/0225791 A1 | 10/2005 | Lee | |
| 2005/0257247 A1 | 11/2005 | Moriconi et al. | |
| 2006/0028689 A1 | 2/2006 | Perry et al. | |
| 2006/0064389 A1 | 3/2006 | Doll-Steinberg | |
| 2006/0293989 A1 | 12/2006 | Morrison et al. | |
| 2007/0013960 A9 | 1/2007 | Gordon et al. | |
| 2007/0112854 A1 | 5/2007 | Franca | |
| 2007/0180032 A1 | 8/2007 | Pearson | |
| 2007/0208875 A1 | 9/2007 | Plewnia | |
| 2007/0208931 A1 | 9/2007 | Koue et al. | |
| 2008/0007793 A1 | 1/2008 | Filbrich et al. | |
| 2008/0123124 A1 | 5/2008 | Smithson | |
| 2008/0126513 A1 * | 5/2008 | Bouchard et al. | 709/217 |
| 2008/0147506 A1 | 6/2008 | Ling | |
| 2009/0164781 A1 * | 6/2009 | Bouchard | 713/165 |
| 2009/0178111 A1 | 7/2009 | Moriconi et al. | |
| 2009/0290692 A1 * | 11/2009 | Fong et al. | 379/88.14 |
| 2010/0290087 A1 * | 11/2010 | Van Hoof et al. | 358/1.15 |
| 2011/0216889 A1 * | 9/2011 | Howell et al. | 379/88.01 |

OTHER PUBLICATIONS

FlowPort User Guide; Aug. 2000; Xerox Corporation; pp. 2-4, 3-10, 4-3, 4-6, 5-3, 5-4, 5-5, 5-18, and 5-38.

Hardcopy Electronic Document Exchange, www.omtool.com accessed via Wayback Machine Internet Archive, "estimated publication date" of May 12, 2002.

Menezes, A.J. et al., Handbook for Applied Cryptography, Prentice Hall, Inc., 553-561 (1997).

* cited by examiner

FROM: %SENDER_NAME%
%SENDER_COMPANY%

TO: %RECIP_NAME% at FAX number %DESTINATION%
%RECIP_COMPANY%

REGARDING: Notice of pending delivery of a confidential document and request for registration as a secure FAX destination

Registration as a Secure FAX Destination

Please sign and date this document in the space below and then FAX it to %SENDER_COMPANY% at the following FAX number: %SENDER_BUSINESS_FAX_PHONE%. By faxing this document to %SENDER_BUSINESS_FAX_PHONE%, you are indicating that %DESTINATION% is a secure FAX destination for documents sent to %RECIP_NAME%.

NAME: _____

SIGNATURE: _____

DATE: _____

Registration Expires on: %EXPDATE%

OMEDID (%OMEDID%)

1234567890

FIGURE 7

METHOD AND SYSTEM FOR SECURE FACSIMILE DELIVERY AND REGISTRATION

RELATED APPLICATIONS

The present application is a continuation application of and claims priority to U.S. Utility application Ser. No. 11/538,628, entitled "Method and System for Secure Facsimile Delivery and Registration" and filed Oct. 4, 2006, which is a divisional application of U.S. Utility application Ser. No. 10/365,674, entitled "Method and System for Secure Facsimile Delivery and Registration" and filed Feb. 11, 2003.

FIELD OF THE INVENTION

The invention relates generally to the field of facsimile transmissions and more particularly to secure methods of delivering documents via facsimile.

BACKGROUND OF THE INVENTION

Facsimile (referred to herein as "fax") technology has become a common and inexpensive means for transmitting documents using publicly available telephone lines. The ability to deliver important documents directly to a recipient is an essential capability of many businesses. However, documents often contain sensitive or private information, and it remains difficult for the sender of a confidential document to be assured that only the indented recipient has access to the document once it is delivered via fax.

In the past, systems and methods have been introduced in an attempt to address this concern. One such method comprises the installation of a software application on both the sending and receiving fax machines, the utilization of personal computers to access secure fax servers, or both. One drawback to this method is that recipients who have never previously received a fax from a specific sender, or who normally do not receive secure fax messages, are required to purchase and install hardware and software prior to receiving a secure fax. Another method includes the use of so-called "facsimile store-and-forward facilities," or "F-SAFF's." The users of such systems are required to maintain some form of "inbox," often located on a computer, from which they can retrieve incoming faxes. To receive an incoming fax, a user logs in using, for example, an ID and password, or enters a personal identification number. Again, this method requires the recipient to perform some function before the sender initializes the transmission. Furthermore, a recipient must re-enter the ID, password, or PIN each time they need to retrieve a confidential document.

As a specific example, a medical professional often must verify a patient's medical history with an insurance company or another physician. Such information is considered personal and confidential, and professionals that transmit this information can be held responsible for its security. However, physicians' offices often send and receive fax messages that do not require secure transmission, and the frequency of receiving information from any one particular sender can be low. Therefore, it is often difficult to justify the hardware, software, training, and maintenance costs associated with maintaining a secure fax server.

Given the need to send and receive confidential documents via fax without requiring recipients to purchase additional computers or software, or subscribe to any additional services, there exists a need for the senders of secure faxes to receive and store recipient fax information as a secure destination.

SUMMARY OF THE INVENTION

The present invention allows an operator of a sending fax machine to request assurances from the prospective recipient of a confidential document that the receiving fax machine is secure. Furthermore, the operator can then store the recipient's fax number as a secure destination for future transmissions. In addition, a sender of a confidential document can send a request to an intended recipient of the confidential document requesting the registration the recipient fax number as secure. Additionally, the invention includes the hardware and software means necessary to implement the claimed methods.

In one aspect of the invention, the sender of a confidential document determines if an intended recipient of a confidential fax has previously registered the receiving facsimile number with the sender as a secure destination. The method can also include delaying transmission of the document until the recipient has registered the receiving facsimile number.

In another aspect of the invention, the sender of a confidential document, upon learning that the recipient fax number is not secure, sends a request to the intended recipient of the confidential document. The request can include a unique identification number or other electronically readable printed symbol, for example, that can be used to register the recipient fax machine with the sender. In one version of the invention, the sender can register the recipient fax machine number, while in another version of the invention the system can automatically register the recipient fax machine if the registration request includes a machine readable code. In another version of the system, the system can use both methods of registration.

The method described above can further include the sender storing the recipient's fax number on a local computer for future reference and retrieval. This approach can enable the sender to send subsequent confidential documents without the recipient having to re-register the fax number or login to any application to retrieve incoming faxes. In another example, the method can include sending a registration request for each individual document sent to a recipient fax number. In another variation of the invention, the method allows the sender to stipulate a validity period for each recipient fax number, after the expiration of which the recipient must reregister the recipient fax number.

In yet another aspect, the invention includes a secure facsimile transmission system. The secure fax transmission system includes a sender user interface, a database module, a communications module, and an application module. The sender user interface communicates with a sender, the database module and the application module over a first communications network and the communications module communicates with a recipient fax machine over a second communications network. The application module receives information associated with a confidential document to be sent via facsimile from the sender user interface. The application module can also include a storage module to allow it to store documents that have not been released for transmission. Additionally, the secure fax transmission system includes a communications module to allow the transmission of documents to a recipient fax machine via public telephone lines. The database module includes a storage facility for storing recipient fax numbers that have been previously registered as secure.

BRIEF DESCRIPTION OF THE DRAWINGS

The above and further advantages of this invention may be better understood by referring to the following description in conjunction with the accompanying drawings. The drawings are not necessarily to scale, emphasis instead being placed upon illustrating the principles of the invention.

FIG. 1 illustrates one exemplary embodiment of the prior art including a first fax machine transmitting a document to a second fax machine over a communications network.

FIG. 7 illustrates an embodiment of a request to register a recipient fax number as secure according to the present invention.

DETAILED DESCRIPTION

Figure 1:
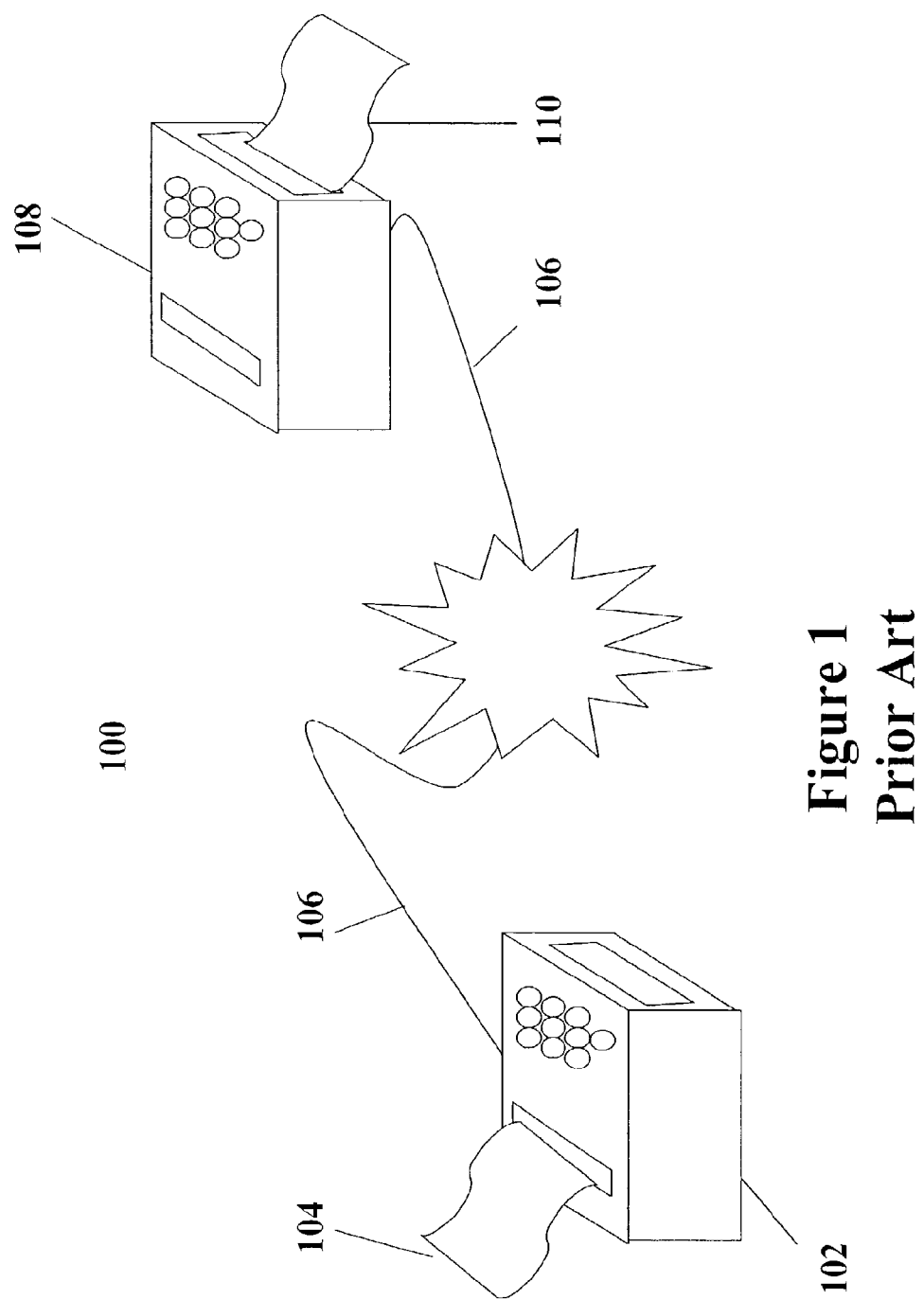

FIG. 1 illustrates one embodiment of a document transmission system 100 using fax machines 102, 108 according to the prior art. The system 100 includes a sending fax machine 102, a document to be delivered via fax 104, a communications network 106, a recipient fax machine 108, and a facsimile copy of the document 110. The user of such a system places the document 104 in the sending fax machine 102 and identifies the recipient fax machine 108 to the sending fax machine 102 by entering the recipient fax machine number into the sending fax machine 102. The sending fax machine 102 then transmits an electronic representation of the document 104 via the communications network 106. The recipient fax machine 108 sends a response to the sending fax machine 102 signaling that it is ready to receive the electronic representation of the document 104. As the receiving fax machine 108 receives the electronic representation of the document from the sending machine 102, the receiving fax machine 108 prints a facsimile copy of the document 110.

Figure 2:
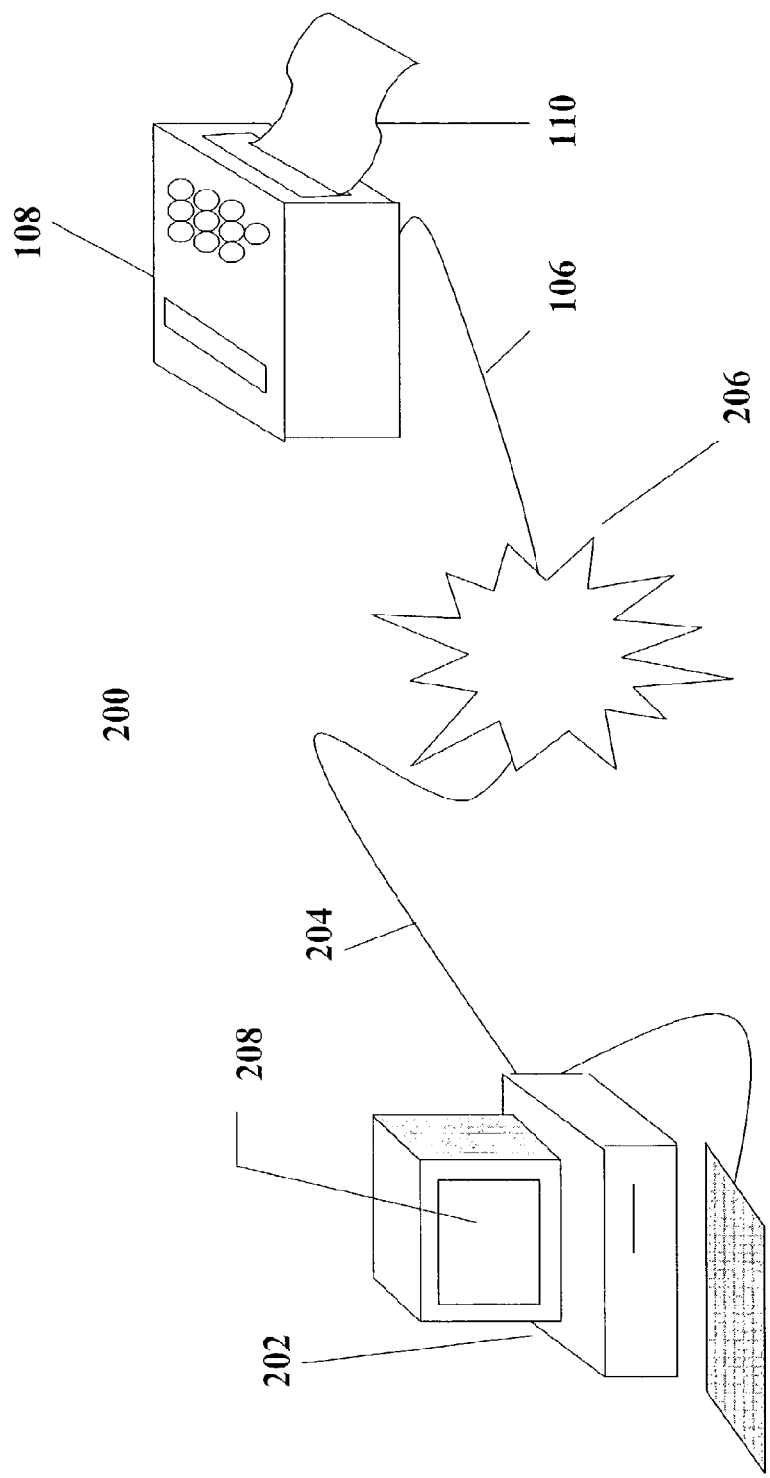
FIG. 2 illustrates one exemplary embodiment of a secure fax transmission system according to the present invention.

FIG. 2 illustrates an embodiment of a secure fax transmission system 200 that includes a client computer 102, a first communications network 204, a second communications network 106, and a recipient fax machine 108. The client 202 includes a sender user interface, and it can communicate with an application server which can reside on the same computer. The application is in communication with the communications module, which is communicates with a second communications network 106, such as the public telephone lines. The second communications network 106 is in communications with a recipient fax machine 108. It should be noted that FIG. 2 is an exemplary embodiment intended only to illustrate and not limit the invention.

The first communications network 204 and the second communications network 106 can be a local-area network (LAN) such as an Intranet, a medium-area network (MAN), public telephone lines, or a wide area network (WAN) such as the Internet or the World Wide Web (i.e., web). Exemplary embodiments of the communication paths 204, 106 can include standard telephone lines, LAN or WAN links (e.g., T1, T3, 56 kb, X.25), broadband connections (ISDN, Frame Relay, ATM), and wireless connections. The connections over the communication paths 204, 106 can be established using a variety of communication protocols (e.g., TCP/IP, IPX, SPX, NetBIOS, Ethernet, RS232, and direct asynchronous connections).

The client computer 202 can be any personal computer (e.g., 286, 386, 486, Pentium, Macintosh computer), Windows-based terminal, network computer, wireless device, information appliance, RISC Power PC, X-device, workstation, mini computer, main frame computer, personal digital assistant, or other computing device that has a windows-based desktop, can connect to a network, and has sufficient persistent storage for executing a small, display presentation program. Windows-oriented platforms supported by the client computer 202 can include, without limitation, WINDOWS 3.x, WINDOWS 95, WINDOWS 98, WINDOWS NT 3.51, WINDOWS NT 4.0, WINDOWS 2000, WINDOWS CE, WINDOWS ME, MAC/OS, Java, and UNIX. The client computer 202 can include a visual display device (e.g., a computer monitor), a data entry device (e.g., a keyboard), persistent or volatile storage (e.g., computer memory) for storing downloaded application programs, a processor, and a mouse.

The client computer 202 includes a sender user interface 208. The interface 208 can be text driven (e.g., DOS) or graphically driven (e.g., Windows). In one embodiment, the sender user interface 208 can use web browser, such as Internet Explorer™ developed by Microsoft Corporation (Redmond, Wash.), to connect to the local network 204. In a further embodiment, the web browser uses the existing Secure Socket Layer (SSL) support, developed by Netscape Corporation, (Mountain View, Calif.) to establish the connection to the local network 204 as a secure network.

Figure 3:
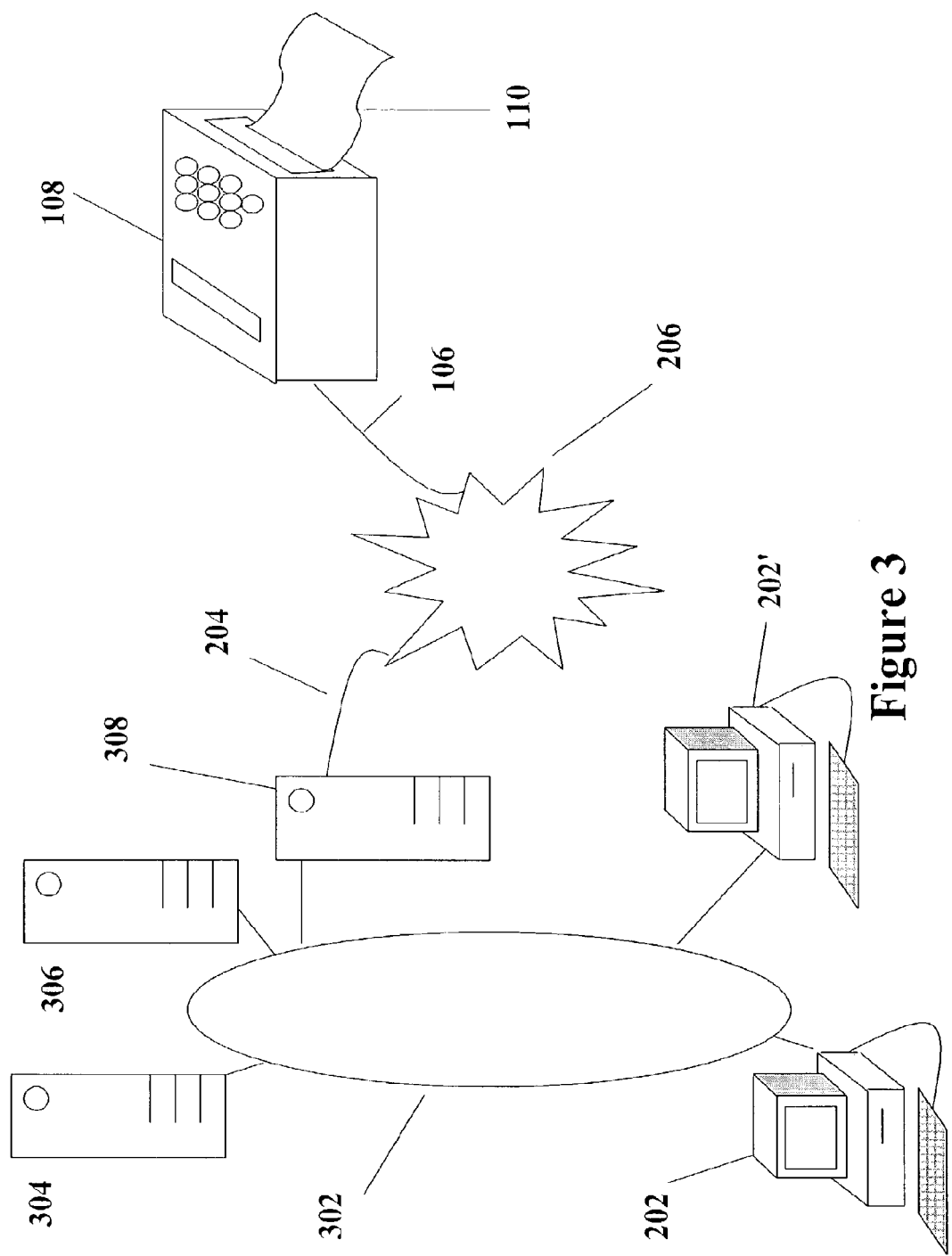
FIG. 3 illustrates another embodiment of a secure fax transmission system according to the present invention.

FIG. 3 illustrates another embodiment of the invention. The sender user interface 208 can reside on one or more client machines 202, 202' and the application module can reside on a server computer 304. The client machine 202 communicates with the server machine 304 over a communications network 302. In another embodiment, the application module can reside on a separate server from the sender client 202. The client machines 202, 202' and the application server machine 304 can be any personal computer described above. Likewise, the communication network 302 can be any communications network described above. In one embodiment, the application server 304 hosts one or more applications that the client 202 can access. In another embodiment, the application server 304 can be a member of a server farm, which is a logical group of one or more servers that are administered as a single entity. In the embodiment shown, the server farm includes the server 304, a second server 306, and a third server 308.

Figure 4:
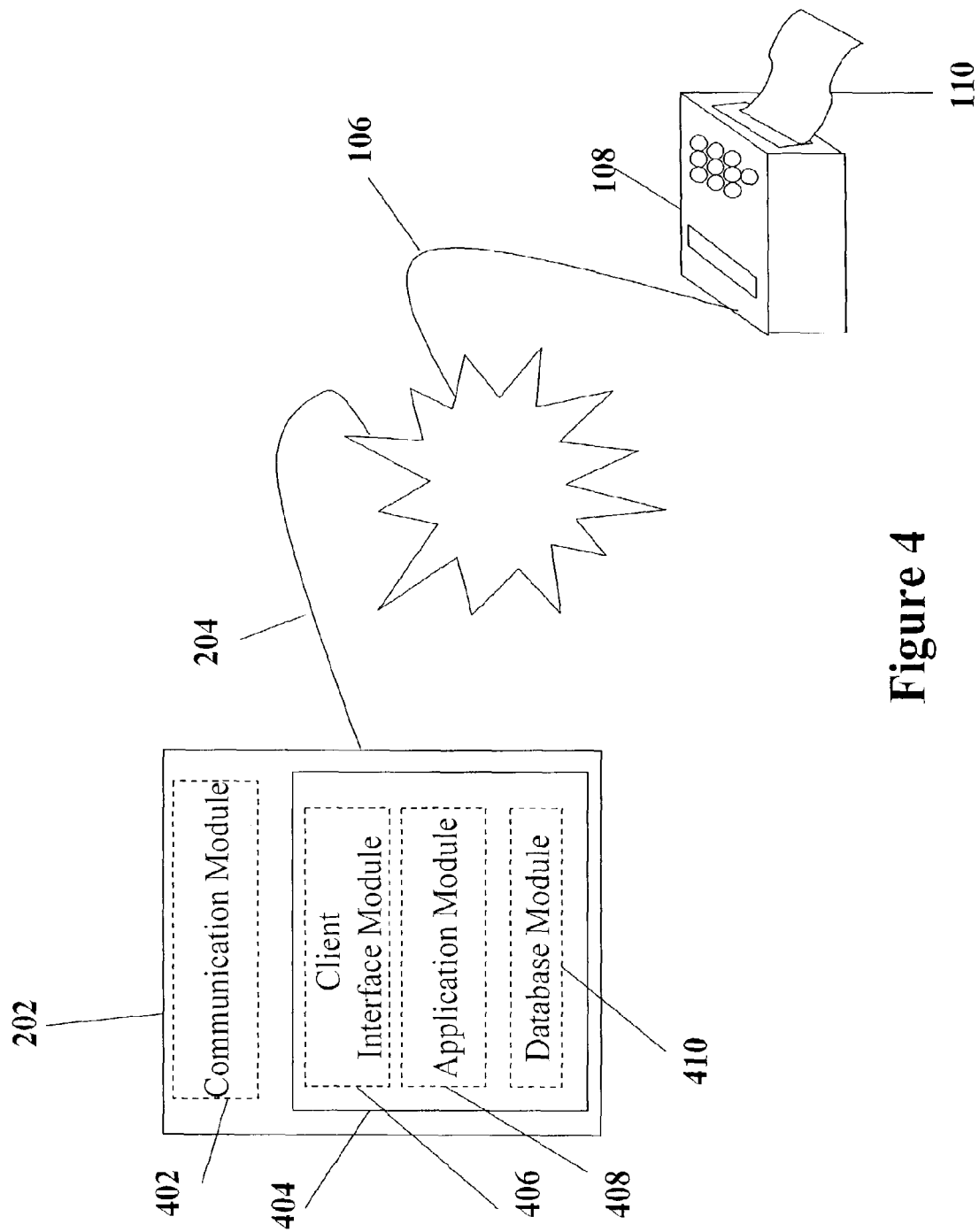
FIG. 4 illustrates a more detailed embodiment of a secure fax transmission system according to the present invention.

FIG. 4 is a more detailed illustration of one embodiment of the invention. The client machine 202 hosts a communication module 402 which facilitates communication with other computers, fax machines, and the like. In addition, the client machine 202 hosts software 404 comprising a client interface module 406, an application module 408, and a database module 410. The client interface module 406 receives instructions from the sender user interface 208 (not shown) and sends the instructions to the application module 408. The application module 408 then parses the instructions to isolate the recipient fax number. The applications module 408 then communicates with the database module 410 to determine if the recipient fax number has been previously stored in the database module 410 and identified as secure. If the application module 408 determines that the recipient fax number is secure, it releases the document and the document is sent to the recipient fax machine 108 using the communications module 402, the first communications network 204, and the second communications network 106.

Figure 5:
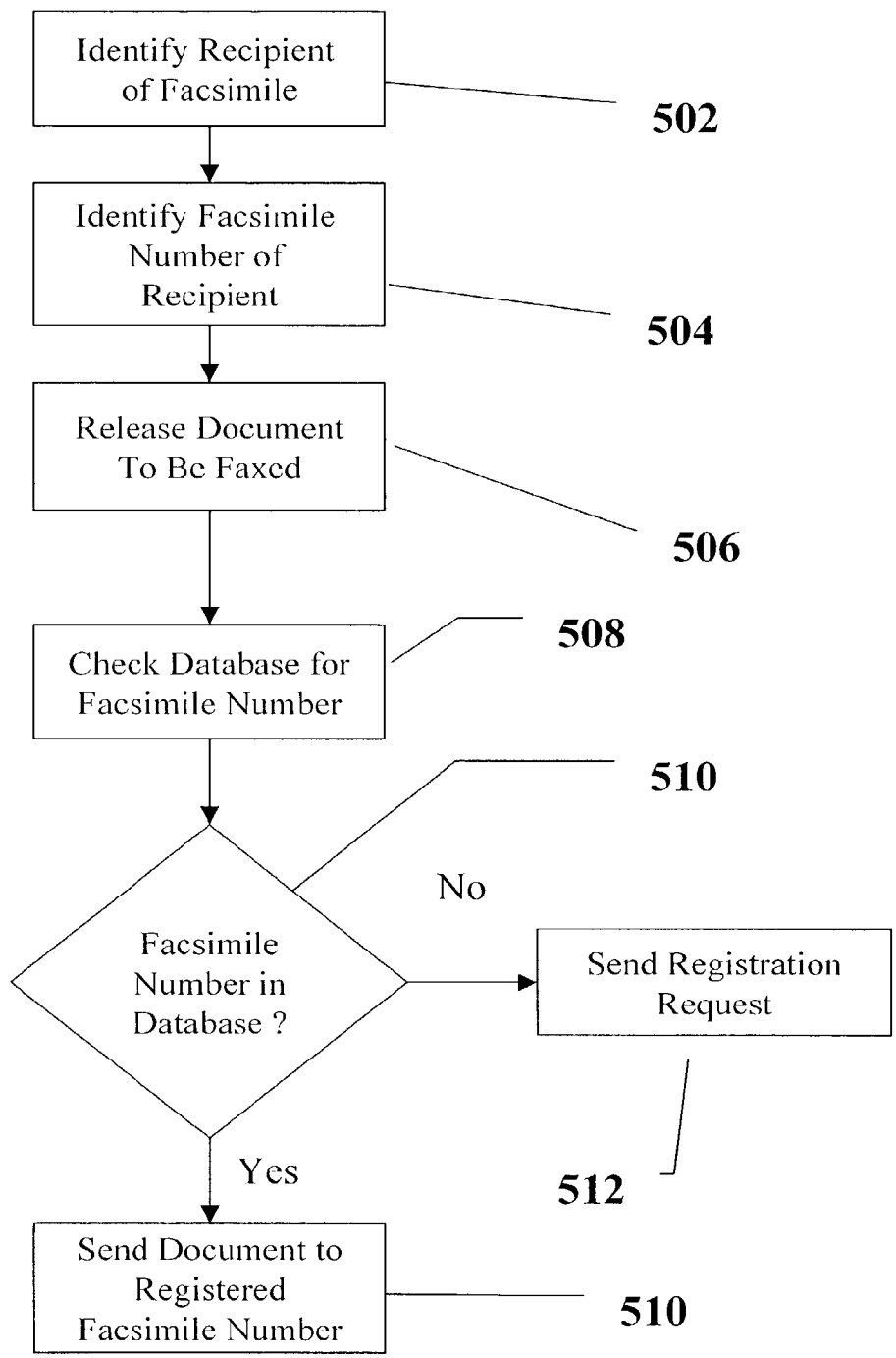
FIG. 5 illustrates one exemplary embodiment of the steps performed by the sender of a confidential document to transmit a document via fax according to the present invention.
Figure 6:
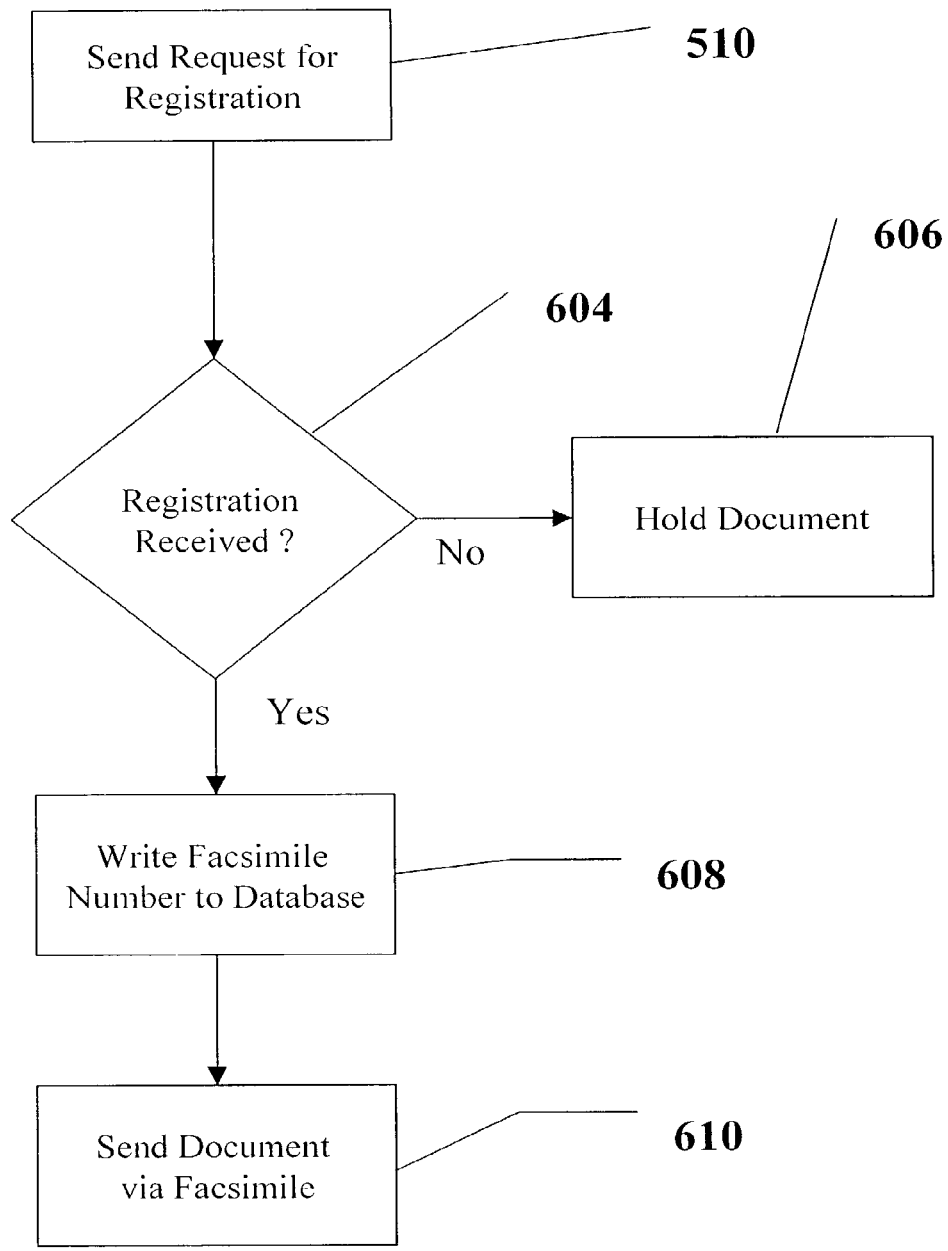
FIG. 6 illustrates an embodiment of the steps performed by the sender of a confidential document to register a recipient fax number as secure according to the present invention.

Referring to FIGS. 5 and 6, the process of the secure fax transmission system can typically be broken down into two sub-processes: 1) fax transmission and 2) recipient registration.

FIG. 5 illustrates one embodiment of the fax transmission sub-process. For example, the sender of a confidential document 104 identifies the intended recipient of the fax, step 502. The sender then enters, retrieves, or somehow otherwise associates a fax number to the recipient, step 504. The sender then releases the document to the application module by selecting the appropriate function on the sender user interface, step 506. The application module then queries the database module to determine if the fax number associated with the recipient has previously been registered as secure, step 508. The application module then determines, based on the response from the database module, if the fax number is secure, decision step 510. If the application module determines that the recipient fax number has previously been registered as secure, the application module releases the document to the communications module and the document is faxed to the recipient, step 510. Conversely, if the application module determines that the recipient fax number has not been previously registered as a secure fax, or that the registration has expired, the application module instructs the communication module to send a registration request to the recipient fax number, step 512.

In an alternative example, the user can instruct the application module to delay the release of each individual document until a unique, document specific registration request has been received from the intended recipient of the secure document.

FIG. 6 illustrates the recipient registration sub-process. Following the step of sending a request for registration, 510, the sender awaits the receipt of the acknowledged registration from the intended recipient. In one embodiment, the sender determines if the registration request has been received, decision step 604. If the registration request has not been received, the sender instructs the application module to hold the document by selecting the appropriate option on the sender client interface, step 606. If the completed registration request has been received, the sender instructs the application module to store the recipient fax number in the database module as a secure fax number by selecting the appropriate option on the sender client interface, step 608. The application module then releases the document to the communications module, which sends the document to the secure fax number, step 610.

An additional feature allows the sender to identify a validity period for the registration. In one approach, the sender identifies the validity period by entering a period of time, expiration date, or the like into the sender user interface when the document is released to the application module. In another approach, when the sender receives the completed registration request, the sender instructs the application module to store the recipient fax number in the database module as a secure fax number and associates the validity period or expiration date with the recipient fax number. The application module then releases the document to the communications module, which sends the document to the secure fax number. In addition, when the application module receives a request to release future documents to previously registered recipient fax numbers, the application module queries the database module to check that the registration exists, and has not expired.

In one alternative approach, the request for registration can include a unique bar code or other electronically readable symbol. When the recipient of the registration request sends the request back to the sender, the communications module recognizes the incoming message as a fax, and sends it to the application module. The application module can then scan the incoming fax and recognize the document as a registration request for a particular recipient by reading the electronically readable symbol. The application module can then automatically send instructions to the database module to store the recipient fax number as a secure fax number. In addition, the application module can instruct the communications module to send the document to the intended recipient. In another feature, the application module sends the registration request to the database module to be stored as a record of acceptance of registration.

Further, although some steps illustrated in FIGS. 5 and 6 are described as a linear flow of operations, the steps can be performed at various times before, during, or after the performed tasks. The steps illustrated can also be performed simultaneously. Consequently, FIGS. 5 and 6 are intended only to illustrate, and not limit, the invention.

FIG. 7 illustrates another feature of the invention is the use of a request registration message that can be sent to the intended recipient of a confidential document. The request for registration document may include, but is not limited to, data elements such as: a sender name; a sender company; a sender phone number; a sender fax number; a recipient name; a recipient company; a recipient phone number; a recipient fax number; an expiration date of the registration; a unique alphanumeric identification number; a bar code; a printed symbolic representation of data, and the like. Additionally, instructions may be included in the request for registration to assist the recipient in registering their fax number as secure.

By employing the methods and system described above, the secure fax transmission system increases the confidence of a sender of confidential documents that the documents will only be seen by the intended recipient without requiring the recipient to modify their systems, or continually enter codes to receive subsequent fax documents.

While the invention has been particularly shown and described with reference to specific preferred embodiments, it should be understood by those skilled in the art that various changes in form and detail can be made therein without departing from the spirit and scope of the invention as defined by the appended claims.

What is claimed is:

1. A method of delivering documents via facsimile, comprising:
identifying a recipient of a document to be sent via facsimile;
identifying a corresponding recipient facsimile number for the document to be sent via facsimile;
determining, by a processor of a computing device, if the recipient facsimile number has been registered as a secure facsimile number, wherein determining comprises:
querying a database module comprising a list of secure facsimile numbers, and
determining, responsive to querying, a result, wherein the result identifies whether the recipient facsimile number is on the list of secure facsimile numbers;
transmitting, by the processor, a registration request to the recipient facsimile number when either (a) the recipient facsimile number has not been previously registered as a secure facsimile number or (b) registration of the facsimile number as a secure facsimile number has expired;
delivering, by the processor, the document via facsimile and one or more previously unsent documents to the recipient facsimile number after the recipient facsimile number is registered as a secure facsimile number.

2. The method of claim 1 further comprising assigning a unique identifier to the document being sent via facsimile.

3. The method of claim 2 wherein the unique identifier is at least one of
a bar code,
an alpha-numeric code, and
a unique printed image.

4. The method of claim 1, further comprising registering the recipient facsimile number as a secure facsimile number, wherein the registration comprises receiving a confirmation that the facsimile number is a secure facsimile number; and storing the recipient facsimile number as a secure facsimile number, wherein the recipient facsimile number is stored in the database as a secure recipient facsimile number.

5. The method of claim 4 further comprising sending a request to register a recipient facsimile number for each document being sent to one recipient of a facsimile.

6. The method of claim 4 further comprising assigning a unique identifier to the recipient facsimile number.

7. The method of claim 4 wherein the step of receiving a confirmation further comprises processing the confirmation.

8. The method of claim 7 wherein the processing step comprises the confirmation being reviewed by a human operator.

9. The method of claim 7 wherein the processing step comprises the confirmation being automatically reviewed by electronic means.

10. The method of claim 9 where the electronic means comprises optical character recognition.

11. The method of claim 4 wherein the step of storing the recipient facsimile number further comprises storing an expiration date of the registration.

12. The method of claim 4 wherein the step of storing the recipient facsimile number further comprises storing a validity period for the registration.

13. The method of claim 4 wherein the step of storing the recipient facsimile number further includes identifying the received registration as a record of accepting the registration.

14. A system for delivering documents to a recipient via facsimile in a secure method, comprising:
a database comprising a list of secure facsimile numbers;
a memory having instructions stored thereon, wherein the instructions, when executed, by a processor of a computing device, cause the processor to:
determine if a facsimile number associated with a recipient is stored in the database and is identified as a secure facsimile number, wherein the determining step comprises:
(i) querying the database, and
(ii) determining, responsive to querying, whether the recipient facsimile number is on the list of secure facsimile numbers;
transmit a request to register the recipient facsimile number as a secure facsimile number when either (a) the recipient facsimile number has not been previously registered as a secure facsimile number or (b) registration of the facsimile number as a secure facsimile number has expired; and
transmit, by the processor of the computing device, the document via facsimile and one or more previously unsent documents to the recipient facsimile number after the recipient facsimile number is registered as a secure facsimile number.

15. The system of claim 14 further comprising a character recognition module for automatically reading printed symbols.

16. The system of claim 14 wherein the printed symbols comprise at least one of
a bar code,
an alpha-numeric code, and
a unique printed image.

17. The system of claim 14, wherein the instructions, when executed, by a processor of a computing device, further cause the processor to: register the recipient facsimile number as a secure facsimile number, wherein the registration comprises receiving a confirmation that the facsimile number is a secure facsimile number; and store the recipient facsimile number as a secure facsimile number, wherein the recipient facsimile number is stored in the database as a secure recipient facsimile number.

18. The system of claim 14, wherein the instructions, when executed, by a processor of a computing device, further cause the processor to assign a unique identifier to the recipient facsimile number.

19. The method of claim 14, wherein the step of receiving a confirmation further comprises processing the confirmation.

* * * * *